United States Patent
Ferte et al.

(10) Patent No.: US 7,021,899 B2
(45) Date of Patent: Apr. 4, 2006

(54) LIGHTENED TURBOMACHINE BLADE AND ITS MANUFACTURING PROCESS

(75) Inventors: Jean-Pierre Ferte, Corbeil Essonnes (FR); Jean-Luc Bour, Dammarie les Lys (FR); Denis Larrouquere, Emerainville (FR)

(73) Assignee: Snecma Moteurs, Paris (FR)

( * ) Notice: Subject to any disclaimer, the term of this patent is extended or adjusted under 35 U.S.C. 154(b) by 65 days.

(21) Appl. No.: 10/807,243

(22) Filed: Mar. 24, 2004

(65) Prior Publication Data
US 2006/0039792 A1    Feb. 23, 2006

(30) Foreign Application Priority Data
Mar. 28, 2003   (FR) .................................. 03 03814

(51) Int. Cl.
*F01D 5/14*    (2006.01)
(52) U.S. Cl. ................ 416/229 A; 416/232; 29/889.72
(58) Field of Classification Search ................ 416/232, 416/229 A; 29/889.7, 889.71, 889.72, 889.721
See application file for complete search history.

(56) References Cited

U.S. PATENT DOCUMENTS

| | | | |
|---|---|---|---|
| 1,762,352 A | 6/1930 | Ray | |
| 2,675,208 A | 4/1954 | Weinberg | |
| 2,807,437 A * | 9/1957 | Roush | 416/233 |
| 3,606,580 A | 9/1971 | Kaufman, Sr. | |
| 3,768,147 A * | 10/1973 | Berry et al. | 228/112.1 |
| 6,705,383 B1 * | 3/2004 | Beeck et al. | 164/76.1 |
| 6,802,122 B1 * | 10/2004 | Milburn | 29/889.72 |
| 6,805,535 B1 * | 10/2004 | Tiemann | 416/233 |
| 2002/0108734 A1 | 8/2002 | Beeck et al. | |

FOREIGN PATENT DOCUMENTS

| | | |
|---|---|---|
| FR | 889568 | 1/1944 |
| FR | 1118892 | 6/1956 |
| FR | 2695163 | 3/1994 |
| GB | 660007 | 10/1951 |
| WO | WO 01/49975 A1 | 7/2001 |
| WO | WO 03/018976 A1 | 3/2003 |

* cited by examiner

*Primary Examiner*—Edward K. Look
*Assistant Examiner*—Devin Hanan
(74) *Attorney, Agent, or Firm*—Oblon, Spivak, McClelland, Maier & Neustadt, P.C.

(57) ABSTRACT

A turbomachine blade includes a metal alloy airfoil having a cavity closed off by a cover on a hollowed side, the cover providing aerodynamic continuity of the hollowed side and being bonded via an edge thereof to the rest of the airfoil by a weld bead. The weld bead emerges on the hollowed side and penetrates into the airfoil to a depth P at least equal to the thickness EC of the edge of the cover so as to provide continuity of material between the edge of the cover and the rest of the airfoil over a depth at least equal to the thickness EC of the edge of the cover. A process for manufacturing such a blade is also disclosed.

20 Claims, 6 Drawing Sheets

LIGHTENED TURBOMACHINE BLADE AND ITS MANUFACTURING PROCESS

TECHNICAL FIELD OF THE INVENTION

The invention relates to turbomachine blades and more particularly to a structure and to a process for manufacturing lightened, hollow metal blades intended, for example, for compressor or fan rotors of bypass turbojets for propelling aircraft.

PRIOR ART AND PROBLEM SOLVED BY THE INVENTION

So as not to burden the description, the constituents of the blade are denoted and referenced in the same way in the case of a blank blade and in the case of a finished blade.

Turbojet components used in aeronautics must combine characteristics of lightness, high vibration resistance and high fatigue resistance. This is the case in particular with the blades mounted around the periphery of bladed compressor or fan rotors. Such blades have very thin airfoils that are subject to alternating tensile and compressive stresses that are liable to fracture them by the appearance and propagation of cracks in their sides. Moreover, the process for manufacturing such blades must be very reliable so as to make the intervals between quality control operations as long as possible.

To try to achieve this result, two alternative technologies are conventionally employed:

The first technology is disclosed, for example, by patent FR 2 688 264 and its corresponding U.S. Pat. No. 5,295,789. The blade is made of metal and has, on the pressure side, a plurality of emergent cavities lined with a low-density organic material, the lightening thus obtained being directly proportional to the total volume of the cavities, the organic lining ensuring continuity of the pressure side and also acting as a vibration damper. The drawback of this technology is that substantial lightening results in an increase in the volume of the cavities and as a consequence the blade is weakened and made more flexible. In addition, the resonant frequencies of the blade are lowered so that the damping provided by the lining decreases. This drawback is reduced, but not eliminated, with the blade disclosed by patent U.S. Pat. No. 5,634,771, this blade having spars arranged to provide better stiffness.

The second technology is disclosed by patent FR 2 754 478 corresponding to U.S. Pat. No. 5,896,658. The blade is made in two parts joined together by diffusion bonding, the joint surface between these two parts going from the leading edge to the trailing edges, stop-off treatments being applied at the places on the joint surface where future cavities will be, the lightening cavities being obtained by hot inflation after the diffusion bonding. This technology makes it possible to obtain blades of very high performance, but the manufacturing process has the drawback of being lengthy and expensive.

Moreover, patent FR 2 695 163 corresponding to U.S. Pat. No. 5,346,613 discloses a lightened blade having, in the thickness direction, a plurality of emergent holes closed off by plugs welded around their periphery with a high-energy beam, such as a laser beam or an electron beam. However, this technology has the drawback that a large amount of material is left between the holes and the blade requires a very substantial amount of welding, since each hole/plug pair must be welded around its entire periphery.

Also known are welding processes of high performance and therefore able to be used in aeronautics. These are essentially the aforementioned diffusion bonding, laser beam welding and electron beam welding. Also known is a recent process called friction stir welding, which consists in making a shouldered finger made of refractory alloy rotate in the zone to be welded, the heat needed for the welding coming from the friction between the finger and the metal of the workpiece. This process is disclosed, for example by U.S. Pat. No. 5,829,664 and U.S. Pat. No. 5,460,317 (plates 1, 2 and 9) and its corresponding patent EP 0 615 480. It should be noted that, during the welding, the welding tool generates very large forces on the workpiece.

The problem to be solved is how to design a structure and a process for the reliable and inexpensive manufacture of lightened blades, the blades having to be of high performance in terms of lightness and mechanical strength.

SUMMARY OF THE INVENTION

To solve this problem, the invention proposes a lightened turbomachine blade comprising an airfoil made of a metal alloy, this airfoil itself having a leading edge, a trailing edge, two sides, a tip and a cavity closed off by a cover, this cover being on one of the two sides, called the hollowed side, this cover providing aerodynamic continuity of the hollowed side, this cover being bonded via the edge to the rest of the airfoil by a weld bead, and the thickness of the edge of the cover being denoted by EC.

Such a blade is noteworthy in that the weld bead emerges on the hollowed side and penetrates the airfoil with a depth P at least equal to the thickness EC of the edge of the cover so as to provide continuity of the material between the edge of the cover and the rest of the airfoil over a depth at least equal to the thickness EC of the edge of the cover.

Such an arrangement helps to increase the mechanical strength and the lifetime of the blade. This is because the continuity of material eliminates any slit in the vicinity of the hollowed side and perpendicular to it, which may exist between the cover and the rest of the airfoil, such slits constituting crack initiators liable to propagate along the hollowed side owing to the effect of the mechanical stresses generated near the hollowed side and directed tangentially to this side.

Advantageously, the width LC of the cavity is at least equal to half the width LP of the airfoil, the width of the airfoil LP being taken between the leading edge and the trailing edge along the geometrical neutral line passing at mid-distance between the sides, the width LC of the cavity being taken between the lateral surfaces along the same geometrical neutral line. Such an arrangement makes it possible to achieve substantial lightening with a single cavity closed off by a single cover, thereby reducing the amount of welding to be done, and consequently the cost of the component.

Advantageously, the weld bead is obtained by rotating a finger that penetrates from the hollowed side between the cover and the rest of the airfoil.

Although this welding process, known as friction stir welding, generates very high mechanical stresses during welding and even though the airfoil of a blade is a thin component ill suited per se to withstand such forces, this type of welding is paradoxically applicable in the present case by implementing the process described below. This type of welding is particularly advantageous as it affords high welding qualities and excellent reproducibility allowing inspection operations to be widely spaced.

The invention also proposes a process for manufacturing such a blade, this process comprising the following operations:
a) production of a blank of the airfoil, for example by forging or casting;
b) cutting of the cavity in the hollowed side, for example by milling;
c) cutting of a socket in the hollowed side, this socket bordering the cavity, this socket having a bearing surface and a lateral surface, this socket may also be milled;
d) production of a cover having an external surface with the shape of the hollowed side, it being possible for this cover to be obtained, for example, by the cutting and forming of a sheet;
e) insertion of the cover into the socket and welding of the edges of the cover to the rest of the airfoil on the hollowed side, the welding being carried out to a depth P at least equal to the thickness EC of the edges of the cover, it being possible for this welding to be carried out for example by a laser beam in an inert atmosphere or in a vacuum by an electron beam; and
f) finishing of the blade, for example, by milling, grinding and surfacing.

Advantageously, the welding is carried out with a friction welding machine of the friction stir welding type, this machine comprising a table and a spindle that are capable of relative displacements along three degrees of translational freedom and two degrees of rotational freedom, the spindle causing a welding tool to rotate about a geometrical axis of rotation, the welding tool having a finger projecting from a shoulder, the blank being placed in a cradle attached to the table, this cradle having a bearing surface of shape complementary to the facing side of the blank, the blank bearing via its side facing said bearing surface, this cradle also having stops surrounding the blank in order to position the latter laterally in the cradle, the cover being inserted into the socket, the whole assembly formed by the blank and the cover being held in place by a number of remotely controlled clamps, the rotating finger being pushed into the hollowed side between the edges of the cover and the rest of the airfoil, the shoulder then being flush with the hollowed side, each controlled clamp being retracted upon passage of the welding tool so as not to interfere with the latter.

Such a process allows the covers to be friction-welded to the airfoils despite the high forces exerted on the airfoil by the welding tool and the thinness and flexibility of the airfoil and the cover. Since the blades are highly stressed in use, this process consequently provides high-quality welds capable of extending the life time of the blades.

DESCRIPTION OF THE FIGURES

The invention will be better understood and the advantages that it affords will become more clearly apparent on looking at a detailed illustrative example and the appended figures.

FIG. 2 illustrates this same blade in a cross section on the line AA in FIG. 1.

FIG. 3 illustrates, in an enlarged view, the weld bead between the cover and the rest of the airfoil.

FIG. 3a illustrates, in an enlarged view, the crack initiator and the possible cracks caused by a weld bead of insufficient depth.

FIG. 4 illustrates the cover and the blank of the blade before assembly.

FIG. 5 illustrates the welding of the cover to the body of the blade.

FIG. 6 illustrates, in an enlarged view, the welding zone and the welding tool.

FIG. 7 illustrates another embodiment of the blade according to the invention, this blade having two cavities, two covers and a central web.

FIG. 8 illustrates, in schematic form, a blade with an open tip, a U-shaped weld bead and a single extension of the tip.

FIG. 9 illustrates, in schematic form, a blade with a closed tip.

FIG. 10 illustrates, in schematic form, a blade with a central rib welded to the cover.

It should be noted that, for the sake of clarity, the blades seen in cross section in FIGS. 2, 4, 5 and 7 are shown without camber and with a highly enlarged thickness.

DETAILED DESCRIPTION

Figure 1:
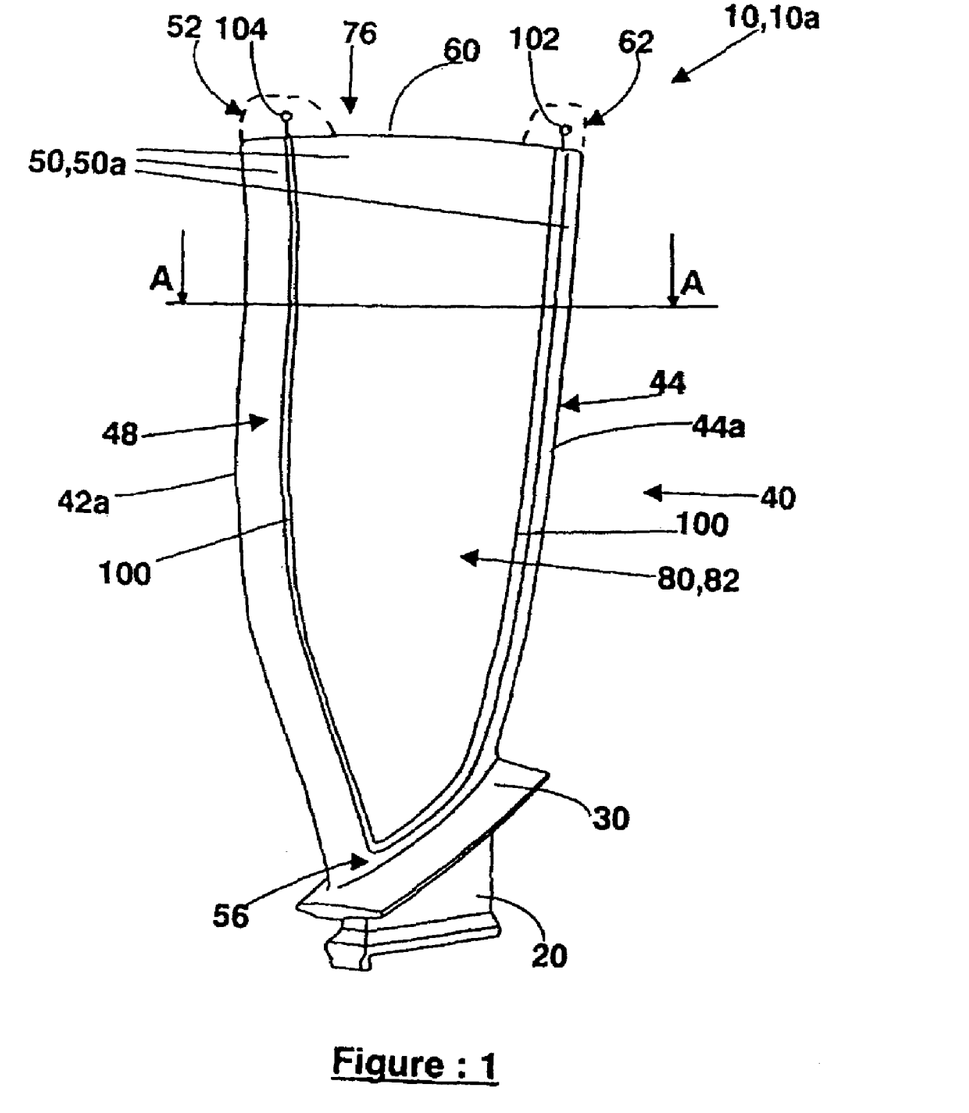
FIG. 1 illustrates a blade according to the invention seen in perspective.

Reference will firstly be made to FIG. 1. The blade 10 is a well-known object comprising, in succession from the bottom up in FIG. 1: a root 20 via which it is fitted into a rotor (not shown), a platform 30 and a airfoil 40. The airfoil 40 is thin and cambered. The airfoil 40 is bonded laterally at the front by a rounded edge called the leading edge 42, at the rear by a second, slimmer, edge called the trailing edge 44 and laterally by two sides 50. The base of the airfoil 40, that is to say that part of the airfoil 40 against the platform 30, will be denoted by 56 and the tip of the airfoil 40, that is to say that end of the airfoil 40 on the opposite side from the platform 30, will be denoted by 60. In addition, the line constituting the end of the leading edge 42 will be denoted by 42a and the line constituting the end of the trailing edge 44 will be denoted by 44a. The airfoil 40 is cambered, that is to say it forms, between the leading edge 42 and the trailing edge 44, an arc in such at way that one of the sides 50 is convex while the opposed side is concave, the convex side 50 being called the suction side and the concave side 50 being called the pressure side.

The width LP of the airfoil 40 between the end 42a of the leading edge 42 and the end 44a of the trailing edge 44 is usually defined. When the airfoil 40 is cambered, this width LP is taken along a geometrical line 46, called the "neutral" curve, passing mid-distance between the two sides 50. The thickness EP of the airfoil 40, that is to say the maximum distance between the sides 50, is also defined, this thickness EP being preferably measured from the tip 60 of the airfoil 40.

Reference will now be made to FIGS. 2 and 3. The airfoil 40 has, in one of its sides 50, called the hollowed side 50a, a cavity 70 closed off by a cover 80 also located in the side 50a. The opposite side 50 to the hollowed side 50a will be denoted by 50b. In addition, the bottom and the lateral surface of this cavity 70 will be denoted by 72 and 74 respectively.

This lateral surface 74 runs along, in succession, the leading edge 42, the base 56 and the trailing edge 44, thus forming a U, the free ends of which emerge at the tip 60 of the airfoil 40, the cavity 70 thus having an opening 76 emerging at this tip 60. The external surface, the internal surface, the edge and the side wall of the cover 80 will be denoted by 83, 84, 85 and 86, respectively. The external surface 82 of the cover 80 is made to the shape of the hollowed side 50a and consequently constitutes that part of the hollowed side 50a above the cavity 70. The internal surface 84 of the cover 80 faces the bottom 72 of the cavity 70.

The material of the airfoil 40 located between the bottom 72 of the cavity 70 and the opposite side 50b constitutes a joining piece 110 that joins the leading edge 42 and the trailing edge 44 together. The minimum thickness of the joining piece 110 will be denoted by $ER_{min}$. The cover 80 and the joining piece 110 cooperate to stiffen the airfoil 40. For this purpose, the cover 80 will be given a minimum thickness $EC_{min}$ at least equal to 0.5 times $ER_{min}$.

To consequently lighten the airfoil 40, the width LC of the cavity 70 is at least equal to 50% of the width LP of the airfoil, the width LC being measured between the lateral surfaces 74 of the cavity running along the leading edge 42 and the trailing edge 44, the width LC being measured along the geometrical neutral line 46.

Preferably, but not necessarily, the cover 80 has a minimum thickness $EC_{min}$ at least equal to 20% of the thickness EP of the airfoil 40 so that this cover effectively contributes to the mechanical strength of the airfoil 40.

The cover 80 fits into a socket 90 made in the airfoil 40 at the edge of the cavity 70, this socket 90 forming a step in the lateral surface 74 of the cavity 70, this socket 90 emerging on the side 50a in which the cavity 70 lies. The socket 90 has a bearing surface 92 located on the inside of the airfoil 40 at a distance from the side 50a equal to the thickness EC of the edge of the cover 80, the cover 80 resting on the bearing face 92 via its internal surface 84. In practice, the bearing surface 92 is adjacent to the lateral surface 74 of the cavity 70 and parallel to the hollowed side 50a. The socket 90 also has a lateral surface 94 adjacent to the hollowed side 50a, this lateral surface 94 being of complementary shape to the side wall 86 of the cover 80, this lateral surface 94 forming with this side wall 86 a small gap in order to allow the cover 80 to fit into the socket 90 until it is able to come into contact with the bearing face 92.

Thus:
 the function of the bearing face 92 of the socket 90 is to position the cover 80 so that its external surface 82 is flush with the hollowed part 50a, that is to say this external surface 82 ensures that the hollowed side 50a is continuous so as to form with it neither a hollow nor a bump nor a shoulder;
 the function of the lateral face 94 of the socket 90 is to position the cover 80 above the cavity 70 so that this cavity 70 is entirely covered by the cover 80 in the hollowed side 50a.

The airfoil 40 also has a weld bead 100 in the hollowed side 50a and is flush with the latter, that is to say not forming with it either a hollow or a bump, this weld bead 100 following the edge of the cover 80 and penetrating into the depth of the airfoil 40 with a depth P at least equal to the thickness EC of the edge 85 of the cover 80, this weld bead 100 thus providing a continuous connection of material from the edge of the cover 80 to the rest of the airfoil 40 over a depth equal to the thickness EC of the edge of the cover 80.

Thus, the weld bead 100 entirely encompasses the lateral surface 94 of the socket 90 and the side wall 86 facing this lateral surface 94, this lateral surface 94 and this side wall 86 consequently disappearing in the weld bead 100. Depending on its type, the weld bead 100 may also encompass part of the bearing surface 92 of the socket 90 adjacent to the lateral surface 94 of the socket 90, and also an identical part of the internal surface 84 of the cover 80 adjacent to the side wall 86.

The continuity of material over a depth at least equal to the thickness EC of the edge of the cover 85 eliminates crack initiators near the hollowed side 50a.

In contrast, in FIG. 3a illustrating the prior art, the weld bead 100 has a depth P less than the thickness EC of the edge 85 of the cover 80. As a result, a part 86a of the side wall 86 and a part 94a of the lateral surface 94 are not lying together and therefore form a crack initiator 102 liable to degenerate into cracks 104 that propagate toward the hollowed side 50a and in the opposite direction into the interior of the airfoil 40 owing to the stresses 106 tangential to the hollowed side 50a.

In this illustrative example of the invention, the cavity 70 emerges at the tip 60 of the airfoil 40. Consequently, the weld bead 100 has an open shape in the form of a U starting from and terminating at the tip 60. This U-shape of the weld bead 100 is illustrated in FIG. 1. This opening makes it possible to lighten the airfoil 40 at its tip 60 and consequently lighten the complete rotor and to effectively reduce its moment of inertia, since this material, that the invention dispenses with at the tip 60 of the airfoil 40, has a maximum moment of inertia on the bladed rotor. This opening has no effect on the balancing of the rotor as the centrifugal force caused by the rotation of the bladed rotor prevents foreign bodies from penetrating the cavity 70, or expels those that had been able to penetrate this cavity when the bladed rotor was at rest.

The weld 100 may be obtained by brazing. In this case, the lateral surface 94 of the socket 90 and the side wall 86 facing this lateral surface 94 are physically conserved. The weld 100 may also be obtained by fusion using an electron beam or a laser beam.

However, in a preferred embodiment, the weld 100 is obtained by the friction stir welding process using a rotating welding tool in the form of a finger penetrating from the hollowed side 50a between the cover 80 and the rest of the airfoil 40, the rotation of the finger in the metal of the workpieces to be welded together providing the heat necessary for the welding. The inventors have found that this type of welding combines two qualities:
 the weld 100 is completely uniform and has no inclusions or lack of material liable to form fracture initiators;
 the weld 100 is formed in a reliable and reproducible manner now requiring only very widely spaced destructive testing.

The inventors explain the excellent uniformity and reproducibility of the weld as follows: owing to the effect of the heat generated, the metal around the rotating finger is brought into the plastic state and undergoes a swirling motion around this finger with a decreasing velocity gradient upon going away from the finger, such a movement causing the metals of the cover and of the rest of the airfoil to mix and absorbing any porosity shrinkage cavities usually found in the case of welding components by fusion of the alloy.

We will now describe a detailed example of a process for producing a blade according to the invention. To do this, reference will be made simultaneously to FIGS. 4, 5 and 6. This process comprises the following operations:
 a. the production of a blank 10a of the complete blade 10, that is to say having the root 20, the platform 30 and the airfoil 40. The airfoil 40 of the blank 10a is cambered to its final shape. The term "blank" is understood to mean the workpiece with the shape of the finished blade, but with less precise dimensions and with excess thickness of material that will subsequently be removed by finishing operations. Depending on the materials used, this blank 10a may be produced by standard forging and machining processes or by casting. The blank 10a has, at the tip 60, at least one extension 62 shown by the broken lines in FIG. 1, this extension 62 being located in a region beyond that which the final blade 10 will occupy, this extension 62 making it possible to produce the start 102 and the end 104 of the weld bead 100 beyond what will become the final blade 10. In other words, the start 102 and the end 104 of the weld bead 100 are in the extension 60 and consequently to the outside of what will be the finished blade 10, so that the material irregularities at this start 102 and at this end 104 are not in the finished blade 10. In this example, the weld bead 100 has the shape of a U and two separate extensions 62 have been provided at the tip 60, one for the start 102 and the other for the end 104 of the weld bead 100;

b. machining of the cavity 70 in the hollowed side 50a of the blank 10a, this cavity 90 emerging in the hollowed side 50a and also at the tip 60, it being possible for the machining to be carried out, for example, by milling using standard techniques. Thus, the bottom 72 and the lateral surface 74 of the cavity 70 will be machined by milling;

c. machining of the socket 90 in the angle of material formed by the lateral surface 74 of the cavity 70 and the hollowed side 50a. The machining may be carried out, for example, by milling using standard techniques. Thus, the bearing surface 92 and the lateral surface 94 of this socket 90 will be machined by milling;

d. production of the cover 80 by cutting a sheet to the shape of the socket 90 and by bending to the shape of the hollowed side 50a of the blank. The thickness EC of the edges of the cover is equal to the depth of the socket 90 in the hollowed side 50a, that is to say at the distance between the bearing surface 92 and this hollowed side 50a, so that the external surface 82 of the cover lies in the extension of the hollowed side 50a and can constitute the latter above the cavity 70. A small gap will be left, in practice from 0.2 mm to 0.5 mm, in order for the cover 80 to be able to be fitted without any difficulty in the socket 90 and to come into contact with the bearing surface 92. However, this gap remains small as it causes, during welding, a lack of material that has to be compensated for by an additional thickness material 180 on the hollowed side 50a and on the external surface 82 of the cover 80. Thus, the socket 90 and the cover 80 are dimensioned so that the cover 80 can be inserted into the socket 90 and bear via its internal surface 84 against the bearing surface 92 so that the external surface 82 lies in the extension of the hollowed side 50a, the lateral surface 94 of the socket 90 surrounding the cover 80 and positioning the latter above the cavity 70 so as to cover this cavity 70 in the hollowed side 50a;

e. next, a placing of the blank 10a flat in a cradle 140 on the table 130 of a friction welding machine (not shown), the opposed side 50b resting on a bearing face 142 of the cradle 140, the blank 10a being surrounded laterally by stops 144 in order to position the blank 10a on top of the bearing face 142 of the cradle 140. Next, the cover 80 is placed in the socket 90 and the blank 10a/cover 80 assembly is clamped in the cradle 140. The cradle 140 thus has the hollowed side 50a and the cover 80 facing a welding tool 170 that rotates about a geometrical axis of rotation 172. The welding tool 170 comprises, in succession starting from its end, a finger 174 adjacent to a shoulder facing its end, the finger 174 and the shoulder 176 being coaxial with the geometrical axis of rotation 172.

f. next, production of the weld bead 100 by rotating the welding tool 140 and making this tool follow a path in space suitable for the rotating finger 174 to penetrate the hollowed side 50a between the edge of the cover 80 and the blank 10a, the shoulder 176 being flush with the hollowed side 50a, the welding tool 170 starting from the tip 60 of the airfoil 40 and thus making the tour of the cover 80 in the hollowed side 50a. It should be noted that, during welding, the geometrical axis of rotation 172 of the welding tool 170 follows in space a path suitable for passing substantially between the lateral surface 94 of the socket 90 and the side wall 86 of the cover 80, this geometrical axis of rotation 172 arriving in the bearing surface 142 of the cradle 140 and defining a path (not referenced) therein, this bearing surface 142 being substantially in contact with the airfoil 40 at least near this path. This allows the cradle 140 to absorb the penetration force 178 without causing the airfoil 40 and the cover 80 to bend;

g. completion of the blade, that is to say the machining of the tip 60 and the rest of the blade 10 by standard methods, namely grinding, milling, surfacing etc. the extension or extensions 62.

The welding machine used is of the "five-axes" numerical control type, that is to say the relative movements of the spindle 132 of the machine relative to the table 130 may take place along three axes of translation and two axes of rotation, these movements being controlled by a computer program, the spindle rotating the welding tool 170 about its geometrical axis of rotation 172 in order to cause the friction of this tool against the workpiece to be welded.

The finger 174 has a sufficient length beneath the shoulder 176 for the depth P of the weld bead 100 to be greater than the thickness EC at the edge 85 of the cover 80. Consequently, the side wall 86 of the cover 80, the lateral surface 94 of the socket 90 and the space formed by the gap that they form between them disappear in the weld bead 100 being formed, these spaces in the form of slits substantially perpendicular to the hollowed side 50a being likened to cracks liable to propagate and cause the blade to fracture under the effect of the alternating stresses on the hollowed side 50a, as illustrated in FIG. 3a.

In practice:

during the welding, the welding tool 170 generates, in the workpiece, a substantial penetration force 178 located substantially along the geometrical axis of rotation 172. Consequently, the bearing face 142 will be given a suitable shape in order to support the blank 10a in line with the weld bead 100 to be produced. In other words, the geometrical axis of rotation 172 passes through this bearing face 142 throughout the welding. With this arrangement, the penetration force 178 is transmitted to the bearing face 142 by simple compression of the blank 10a and of the cover 80, without causing these two components, which are very thin, to bend;

also during the welding, the welding tool 170 generates a force tangential to the hollowed side 50a and a large moment that are liable to deform and laterally displace, on the one hand, the blank 10a relative to the bearing face 142 of the cradle 140 and, on the other hand, the cover 80 relative to the blank 10a.

Consequently, the stops 144 are arranged in order to accurately position the blank 10a, for example to less than 1 mm. The stops will be strong enough to withstand the forces generated by the friction welding and have a width sufficient to distribute the forces along the leading edge 42 and along the trailing edge 44 without marking or deforming them.

Also consequently, the blank 10a and the cover 80 are immobilized in the cradle 140 by clamps 160 that bear simultaneously on the hollowed side 50a and on the edge of the cover 80. This arrangement has the effect of gripping the blank 10a between the clamps 160 and the bearing face 142 of the cradle 140 in such a way that this blank 10a is subjected to simple compression allowing a very high immobilization force without causing any bending liable to deform it. Likewise, this arrangement has the effect of gripping the edges of the cover 80 and the blank 10a between the clamps 160 and the bearing face 142 of the cradle 140, in such a way that this blank 10a and this cover 80 are subjected to simple compression allowing a very high immobilization force without causing any bending liable to deform them.

Such clamps will be remotely actuated, for example, by hydraulic cylinders, these clamps being retracted at the moment the welding tool passes, so as not to interfere with it, these clamps then being put back into the clamped position in order to hold the blank and the cover in place during the welding that continues.

However, this type of welding introduces irregularities in the surface of the workpiece and in general a slight depression arising from the lack of material corresponding to the spaces an inevitable gaps between the workpieces to be welded. This depression is in general not greater than the additional thickness of material of the blank 10a, this additional thickness being removed by grinding and surfacing during the finishing operations. If this additional thickness were to be insufficient, a 0.2 to 0.5 mm bump 180 would be formed on the hollowed side 50a, this bump 180 running along the blank 10a, providing an addition of material and being subsequently removed during the finishing of the airfoil 40.

Reference will now be made to FIG. 7. In one particular embodiment of the invention, the blade 10 has a cavity 70 on each of the sides 50 of the airfoil 40, each cavity 70 being closed off by a cover 80, each cover 80 being bonded to the rest of the airfoil 40 by a weld bead 100. Consequently, in this case, the joining piece 110 between the leading edge 42 and the trailing edge 44 occupies a central position between the two cavities 70.

Reference will now be made to FIG. 8. In one particular embodiment of the invention, there is only one extension 62 and this encompasses both the start 102 and the end 104 of the weld bead 100.

Reference will now be made to FIG. 9. In another embodiment of the invention, the tip 60 of the blade 10 is closed. In other words, the cavity 70 beneath the cover 80 does not emerge on the tip 60. In this case, the start 102 and the end 104 of the weld bead 100 are coincident or are located substantially at the same point on the extension 62, this weld bead 100 going around the entire periphery of the cover 80 and consequently describing a closed loop.

Reference will now be made to FIG. 10. In another embodiment of the invention, with the tip 60 being open, the cavity 70 has a central rib 190 welded to the cover 80 and illustrated by the broken lines in FIG. 5. The central rib 190 consequently joins the bottom 72 of the cavity 70 to the cover 80 and thus improves the stiffness of the airfoil 40 in the direction of its thickness. The central rib 190 is approximately equidistant from the lateral surfaces 74; adjacent to the leading edge 42 and to the trailing edge 44, this central rib 190 starting from the surface 74 close to the root 20, therefore at the base of the U-shape, the central rib 190 going up to the tip 60.

The cover 80 is also welded to the central rib 190 by a "central" weld bead 100', the start 102' of which is located on the weld bead 100 at the base of the U-shape, the end 104' of the central weld bead 100' being in the extension 62. In practice, the process will start by the production of the central weld bead 100', its start 102' being above the central rib 190 and on the base of the U-shape, this central weld bead 100' following the central rib 190, its end 104' being in the extension 62. Next, the weld bead 100 will be produced along the edges of the cover and passing through the start 102' of the central weld bead 100' so as to absorb any irregularities in the material at the start 102' of the second weld bead 100'.

The invention claimed is:

1. A process for producing a lightened turbomachine blade, comprising the following operations:
   a) production of a blank of an airfoil;
   b) cutting of a cavity into one side, called the hollowed side;
   c) cutting of a socket in the hollowed side, the socket bordering the cavity and having a bearing surface and a lateral surface;
   d) production of a cover having an external surface with the shape of the hollowed side and an internal surface opposite the external surface, the socket and the cover being dimensioned so that the cover can be inserted into the socket and bear the internal surface against the bearing surface so that the external surface lies in an extension of the hollowed side, a lateral surface of the socket surrounding the cover and positioning the latter above the cavity in order to cover the cavity in the hollowed side;
   e) insertion of the cover into the socket and welding edges of the cover to the rest of the airfoil on the hollowed side, the welding being carried out by a rotation of a welding tool, having a finger and a shoulder, penetrating from the hollowed side between the cover and the rest of the airfoil until contact of the shoulder with the hollowed side and the cover, the welding tool then being moved along a welding path, and a weld bead penetrates into the airfoil to a depth P at least equal to a thickness EC of the edges of the cover so as to provide continuity of material between the edges of the cover and the rest of the airfoil over a depth at least equal to the thickness EC of the edges of the cover; and
   f) finishing of the blade.

2. The process as claimed in claim 1, wherein the welding is carried out by a friction welding machine, this machine comprising a table and a spindle that are capable of relative displacements along three degrees of translational freedom and two degrees of rotational freedom, the spindle causing a welding tool to rotate about a geometrical axis of rotation, the welding tool having the finger projecting from the shoulder, the blank being placed in a cradle attached to the table, the cradle having a bearing surface of shape complementary to a facing side of the blank, the blank bearing via a side thereof facing said bearing surface, the cradle having stops surrounding the blank in order to position the latter laterally in the cradle, the cover being inserted into the socket, the whole assembly formed by the blank and the cover being held in place by a number of remotely controlled clamps, the finger being pushed into the hollowed side between the edges of the cover and the rest of the airfoil, the shoulder then being flush with the hollowed side, each controlled clamp being retracted upon passage of the welding tool so as not to interfere with the latter.

3. The process as claimed in claim 2, wherein the blank has, at a tip thereof, at least one extension located in a region beyond that which the final blade will occupy, a start and an end of the weld bead being in the extension.

4. A lightened turbomachine blade made by the process as claimed in claim 2.

5. The process as claimed in claim 3, wherein with the tip being open and the cavity having a central rib welded to the cover by a central weld bead, a start of which is referenced, the start of the central weld bead is on a lateral weld bead and wherein the central weld bead is produced prior to the lateral weld bead.

6. A lightened turbomachine blade made by the process as claimed in claim 5.

7. A lightened turbomachine blade made by the process as claimed in claim 3.

8. A lightened turbomachine blade made by the process as claimed in claim 1.

9. A process for producing a turbomachine blade, comprising:
    producing an airfoil blank;
    cutting a cavity on a hollowed side of the airfoil blank;
    cutting a socket bordering the cavity in the hollowed side, the socket having a bearing surface and a lateral surface;
    producing a cover having opposite internal and external surfaces, a portion of the internal surface being shaped so as to match a portion of the hollowed side, the socket and the cover being dimensioned so as to allow the cover to be inserted into the socket with the internal surface placed against the bearing surface so that the external surface lies in an extension of the hollowed side, a lateral surface of the socket surrounding the cover and the latter being positioned so as to cover the cavity in the hollowed side;
    inserting the cover into the socket and welding edges thereof to the airfoil on the hollowed side, the welding being carried out by a welding tool penetrating from the hollowed side between the cover and the airfoil until contact is made of the welding tool with the hollowed side and the cover, moving the welding tool along a welding path, and forming a weld bead penetrating into the airfoil to a depth P at least equal to a thickness EC of the edges of the cover so as to provide continuity of material between the edges of the cover and the airfoil over a depth at least equal to the thickness EC; and
    finishing the blade.

10. The process as claimed in claim 9, wherein the welding is carried out by a friction welding machine, the welding tool comprises a finger and a shoulder, and the friction welding machine comprises a table and a spindle capable of relative displacements along three degrees of translational freedom and two degrees of rotational freedom, the spindle causing the welding tool to rotate about a rotational axis.

11. The process as claimed in claim 10, further comprising:
    placing the blank in a cradle attached to the table, the cradle having a bearing surface complementarily shaped to a facing side of the blank, the blank bearing via a side thereof facing the bearing surface, the cradle having stops surrounding the blank to position the latter laterally in the cradle, the cover being inserted into the socket, and the blank and the cover being held in place by a number of remotely controlled clamps;
    pushing the rotating finger into the hollowed side between the edges of the cover and the airfoil, the shoulder then being flush with the hollowed side; and
    retracting each controlled clamp upon passage of the welding tool.

12. The process as claimed in claim 9, wherein a tip of the blank has at least one extension located in a region beyond that occupied by the finished blade, and a start and an end of the weld bead is disposed in the at least one extension.

13. The process as claimed in claim 12, wherein, with the tip being open and the cavity having a central rib welded to the cover by a referenced central weld bead, a start of the referenced central weld bead is on a lateral weld bead and the referenced weld bead is produced prior to the lateral weld bead.

14. The process as claimed in claim 12, wherein the blade comprises only one extension encompassing both the start and the end of the weld bead.

15. The process as claimed in claim 14, wherein the tip of the blade is closed, the cavity beneath the cover does not emerge on the tip, the start and the end of the weld bead are coincident or are located substantially at a same point on the extension, and the weld bead describes a closed loop around an entire periphery of the cover.

16. A lightened turbomachine blade made by the process as claimed in claim 9.

17. The process as claimed in claim 9, wherein a minimum thickness of the cover is equal to at least one half of the thickness of a piece that joins leading and trailing edges of the airfoil together.

18. The process as claimed in claim 9, wherein a width of the cavity is at least equal to one half of the width of the airfoil.

19. The process as claimed in claim 9, wherein a minimum thickness of the cover is equal to at least 20% of a thickness of the airfoil.

20. The process as claimed in claim 9, wherein the welding comprises brazing or fusion using an electron beam or laser beam.

* * * * *